UNITED STATES PATENT OFFICE.

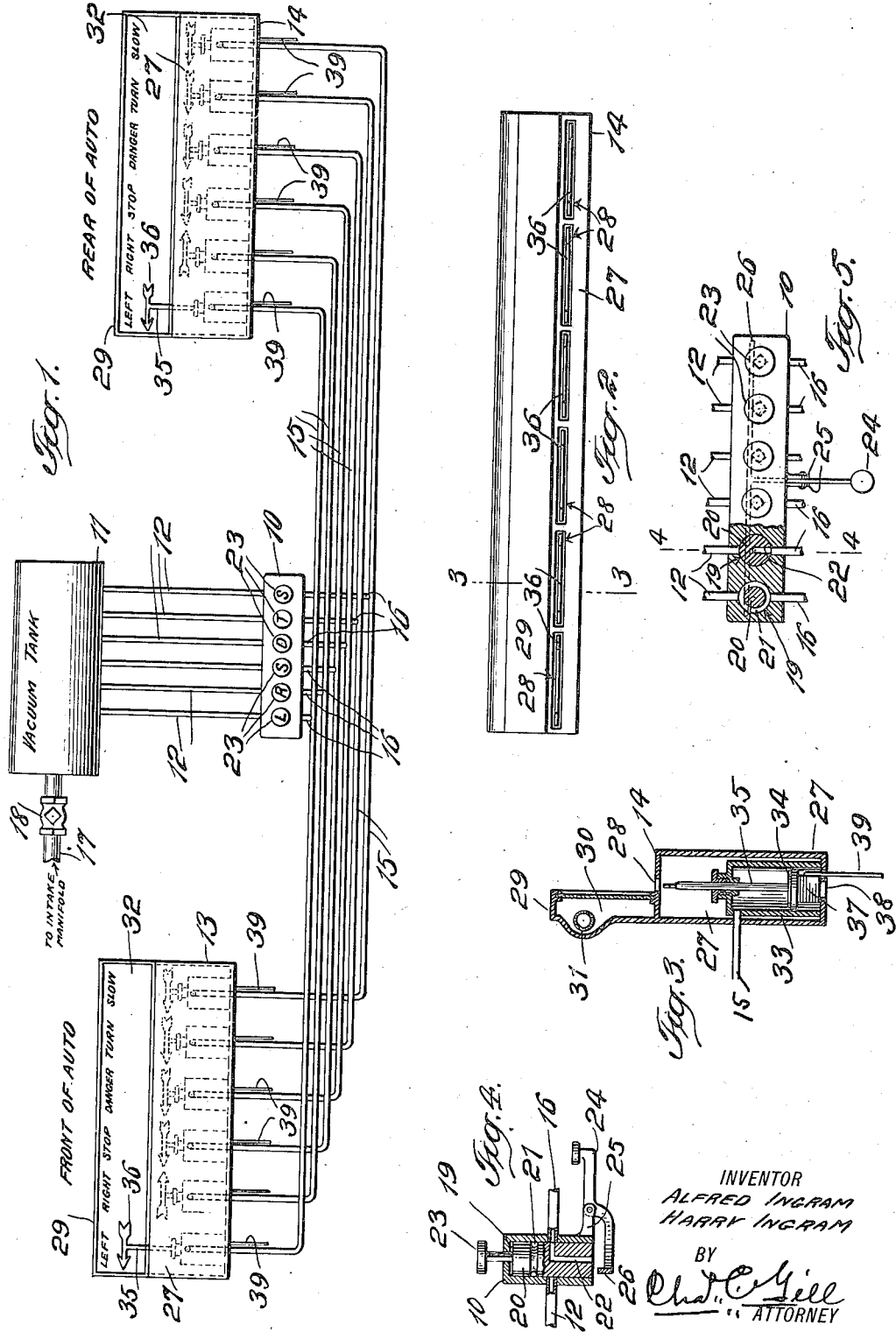
A. AND H. INGRAM.
ANNUNCIATOR FOR AUTOMOBILES AND OTHER PURPOSES.
APPLICATION FILED NOV. 7, 1918. RENEWED SEPT. 23, 1921.
1,414,134.
Patented Apr. 25, 1922.
INVENTOR
ALFRED INGRAM
HARRY INGRAM
BY
ATTORNEY

ALFRED INGRAM AND HARRY INGRAM, OF BROOKLYN, NEW YORK, ASSIGNORS TO INGRAMS INCORPORATED, OF BROOKLYN, NEW YORK, A CORPORATION OF NEW YORK.

ANNUNCIATOR FOR AUTOMOBILES AND OTHER PURPOSES.

1,414,134.     Specification of Letters Patent.     Patented Apr. 25, 1922.

Application filed November 7, 1918, Serial No. 261,539. Renewed September 23, 1921. Serial No. 502,685.

*To all whom it may concern:*

Be it known that we, ALFRED INGRAM and HARRY INGRAM, citizens of the United States, and residents of Brooklyn, in the county of Kings and State of New York, have invented certain new and useful Improvements in Annunciators for Automobiles and Other Purposes, of which the following is a specification.

The invention pertains more particularly to indicating apparatus applicable to automobiles and the like for displaying various signals announcing from one automobile to automobiles at the rear or front thereof, or at both locations, conditions to be observed by them, the apparatus of our invention rendering it possible for the driver of an automobile to mechanically display signals indicating whether he proposes to turn to the right or to the left or stop or slow down, as well as other conditions.

We present our invention herein as embodied in an apparatus adapted to display signals at both the front and back of an automobile, but of course do not limit our invention to the duplex character thereof, since the indicating apparatus may be used at either the front or back of an automobile, or at both locations, as may be preferred.

In its preferred form, the apparatus of our invention is operable from a key-board member within convenient reach of the driver, and comprises said key-board member, sets of signals corresponding with indications on the key-board member arranged at the front and back of the automobile and respectively connected by piping with the several parts of the key-board member and a vacuum tank connected by piping with the respective parts of said key-board member and also with the intake manifold of the engine or motor, so that a vacuum may be automatically created and maintained in said tank and utilized under the manipulation of the keys of the key-board for actuating the said signals or indicating devices.

The invention will be fully understood from the detailed description hereinafter presented, reference being had to the accompanying drawings, in which:

Fig. 1 is an elevation, diagrammatically presented, of an indicating apparatus embodying our invention, the signal devices being illustrated as arranged for use at both the front and the back of an automobile;

Fig. 2 is a top view, on a larger scale, of the indicating apparatus for either the front or back of an automobile;

Fig. 3 is a vertical section through the same, taken on the dotted line 3—3 of Fig. 2;

Fig. 4 is a vertical section through the key-board member of the apparatus taken on the dotted line 4—4 of Fig. 5, and Fig. 5 is a top view, partly in horizontal section, of the key-board member of the apparatus, the piping leading to and from the respective parts of the same being partly broken away.

In the drawings, 10 designates the key-board member of the apparatus, 11 a vacuum tank in communication by means of independent pipes 12 with the features of said key-board member, 13 a front casing for the indicating features connected by piping with said key-board member, and 14 a rear or back casing for indicating features also connected by piping with said key-board member, the features of the indicator casings 13, 14 being connected for simultaneous operation by piping 15, and the connection of said indicator features with the key-board member 10 being by means of a series of pipes or tubes 16 extending from said key-board member and respectively being in communication with the respective pipes 15.

The vacuum tank 11 is an ordinary metal tank connected by a pipe 17 with the intake-manifold of the motor or engine (not shown) and having an automatic check valve 18 of customary character which permits suction from the tank 11 and maintains, so far as the pipe 17 is concerned, the vacuum within said tank.

The key-board member 10 is of box formation and contains a series of vertical chambers 19 within which are vertically movable plungers 20, said plungers each having, as shown in Fig. 4, an annular groove 21, a lower right-angular port 22 and an exposed finger or thumb-piece or head 23, by means of which the plungers may be depressed when it is desired to display the signals and upon which may be located initials, as shown in Fig. 1, indicative of the several signals, the letter "L," for illustration, on the left hand head or thumb-piece 23 denoting "left," the letter "R" on the next adjacent head or thumb-piece denoting "right," the letter "S" on the next adjacent head or thumb-piece to the right denoting "stop,"

the letter "D" on the next adjacent head or thumb-piece denoting "danger," the letter "T" on the next adjacent head or thumb-piece denoting "turn," and the letter "S" on the right hand head or thumb-piece indicating "Slow." The letters on the thumb-pieces or heads 23 will vary in accordance with the characters intended to be displayed at the signal casings 13, 14, and we will employ as many or as few of said thumb-pieces or keys 23 as may be found desirable. Each plunger 20 normally fills and snugly fits its cylindrical chamber 19, and in operation is to be manually depressed, and any or all of the plungers 20 may be elevated or moved to normal at rest position by means of a lever 24, which is pivotally mounted on bracket arms 25 rigid with the key-board member 10 and has a horizontal rod 26 normally extending below all of the plungers 20, so that upon the depression of the exposed end of the lever 24 said rod 26 may move upwardly against all of the plungers 20 or such of them as may be in a depressed condition, and elevate said plungers to their normal position indicated in Fig. 4.

Each cylindrical chamber 19 is connected by a pipe or tube 12 with the vacuum tank 11 and by one of the pipes 16 with one of the pipes or tubes 15, and the pipes or tubes 12, 16 enter the chambers 19 on the same plane, as shown in Fig. 4, so that on the depression of a plunger 20 its annular groove 21 may pass into line with said pipes 12, 16 and afford a means of communication from one to the other of said pipes. When the plungers 20 are in their upper position, shown in Fig. 4, the annular groove therein is above the pipes 12, 16, and hence at such time performs no function. When the plungers 20 are moved to their upper position, those portions of the plungers below the grooves 21 close the pipes 12 so that the vacuum may be maintained in the tank 11, and at such time the angular ports 22 in said plungers pass into line with the pipes or tubes 16 and place the pipes or tubes 15 in communication with the open atmosphere, thereby permitting the return of the signalling devices to their normal position, as hereinafter explained.

The plungers 20 should be properly guided within the cylindrical chambers 19 so that said plungers when in their upper position will always, through the ports 22, place the pipes or tubes 16 and 15 in communication with the open air, and the guiding of the plungers 20 may be accomplished in many ordinary ways, one of which might be to have the stems of the heads 23 of polygonal cross-section and received in apertures in the top of the key-board member 10 of corresponding outline.

Any one or more of the plungers 20 may be depressed, as occasion may require, by downward pressure applied on the head or heads 23 thereof, and if it is only desired to indicate one signal, as "left," for illustration, only one of said plungers will be depressed.

The casings 13, 14 are exactly alike and intended to simultaneously display corresponding indications, and each of said casings comprises a box 27 having openings 28 in its top and equipped at one side of said openings with an auxiliary casing 29 affording a chamber 30 for electric lamps 31. The front of each auxiliary chamber 29 has a glass panel 32 which is in close relation to the vertical plane of the openings 28. As many lamps 31 as may be desired will be employed and one of their purposes is to illuminate the chamber 30 and, through the glass panel 32, bring into view, especially at night, any of the indicator devices which may be elevated to exposure position at the front of the panel 32.

Within the box 27 of each casing 13, 14 is located a series of cylinders 33 which are stationary, and within each cylinder 33 is a piston 34 having an upwardly extending rod 35 carrying at its upper end an indicating device, such as an arrow, 36, the rods 35 and arrows 36 being normally directly below the openings 28 in the casings 13, 14 and adapted to move vertically therein to an upper exposed position or downwardly to a concealing position, the latter being shown in Fig. 3. When the arrows 36 are elevated by the upward movement of the pistons 34 and rods 35, they stand directly below the words or signs as "Left," "Right," etc., which are painted on the glass fronts 32 and illuminated by the lamps 31 when said lamps are lighted. The pistons 34 have weighted lower ends 37 to assist them in returning to their lower position, and below said pistons the lower ends of the cylinders 33 are open above openings 38 in the bottom of the casings 13, 14, said openings 38 permitting the air to escape and the pistons 34 to, at the proper time, descend. The pistons 34 should be guided in their movements so that the arrows 36 may always be in position to pass through the openings 28 and stand in proper alignment with relation to the glass front 32, and to this end we preferably secure to each of said pistons a vertical rod 39 which extends downwardly through a reasonable close fitting opening in the bottom of the boxes 27.

The cylinders 33 contained within the respective casings 13, 14 are respectively connected with each other by the pipes 15 which enter, at their ends, the upper ends of said cylinders, and hence the cylinders 33 are, by means of said pipes 15, respectively placed in communication with the pipes 16 connected with the key-board member 10.

In the employment of the apparatus any one or more of the heads 23 may be depressed for the purpose of indicating corresponding signals at the front of the casings 13, 14. When, for illustration, the left hand head 23, looking at Fig. 1, is depressed until its annular groove 21 places the pipe 12, 16, associated with the left hand plunger 20, in communication with each other, the left hand cylinders 33 in the casings 13, 14 will, through the upper pipe 15, be placed in communication with the vacuum tank 11, with the result that the air in said left hand cylinders 33 will exhaust towards said tank and that the suction will elevate the pistons 34 of said left hand cylinders 33, whereby said pistons will be caused to move the left hand arrows 36 through the left hand openings 28 of the casings 13, 14 and effect the display of said arrows at the glass fronts 32 and below the word "Left" appearing on said fronts 32, as shown in Fig. 1. When it is not desired to any longer display the left hand arrows 36, the operator may, by pressing on the lever 24, cause the bar 26 to elevate the left hand plunger 20, to the position shown in Fig. 4, thereby cutting off communication between the left hand pipe 12 and upper pipe 15 and placing the port 22 in said plunger in communication with said upper pipe 15, this resulting in the left hand cylinders 33 being opened to the atmosphere through said upper pipe 15 and in the pistons 34 in said cylinders automatically descending and withdrawing the left hand arrows 36 into the casings 13, 14.

The operation above described with respect to the left hand head 23 and the display of the left hand arrows 36 is descriptive of the operation which takes place when anyone of the heads 23 is depressed, and therefore it will be unnecessary to describe the same operation with respect to each of said heads 23. The head 23 corresponding with the signal to be displayed, will be pressed downwardly and when so depressed the exhaust action hereinbefore described will elevate the arrow 36 with which said head is associated. It will, of course, never be necessary to depress all of the heads 23 at one time, but that may be done if it should be desired to elevate all of the arrows 36 in both casings 13, 14. Each cylinder 33 is connected with its appropriate pipe 15 and said pipe is connected through the appropriate pipe 16 with the associated chamber 19, and hence in the operation of the apparatus each cylinder 33 with its associated arrow 36 has an operation which is independent of the operation of all of the other cylinders 33 and arrows 36. In each case, however, on the depression of a button head 23, the exhaust, created by the vacuum in the tank 11, effects the movement of an indicating arrow 36 to its proper display position.

We may use as many or as few of the signals as may be preferred, and the signals may be arranged at the back of an automobile or at the front of an automobile or in both of said locations, as may be desired.

We have particularly described the invention as applied to use on an automobile, but do not desire to limit the invention to its specific employment on an automobile, although it will be obvious that when the vacuum tank 11 is connected with the manifold intake of the engine or motor on an automobile, the apparatus may be both efficiently and economically maintained. Neither do we limit the invention to all of the details of form and construction shown and described, since it is obvious that these may be modified in many ways within the spirit of and without departure from our invention.

What we claim as our invention and desire to secure by Letters-Patent, is:

1. Signalling apparatus comprising a signal to be displayed, a vacuum tank of adequate size in which a constant vacuum may be maintained, means for automatically creating and maintaining the vacuum in said tank, and means for applying the pressure of the exhaust from the tank on the signal for thereby effecting the display of the same.

2. Signalling apparatus comprising a vacuum tank, of adequate size in which a constant vacuum may be maintained, means for automatically creating and maintaining the vacuum in said tank, a signal to be displayed, a pipe connection leading from said tank to said signal, and manually operative means interposed in said connection normally closing the same and adapted when operated to open the same and thereby permit the pressure of the exhaust action from the tank to effect the display of the signal.

3. Signalling apparatus comprising a vacuum tank of adequate size in which a constant vacuum may be maintained, means for connecting the same with the intake manifold of a vehicle motor, and having an automatic check valve between said tank and said motor, means for automatically creating and maintaining the vacuum in said tank, a signal to be displayed, and manually operative means for applying the pressure of the exhaust from the tank on the signal for effecting the display of the same.

4. Signalling apparatus comprising a vacuum tank of adequate size in which a constant vacuum may be maintained, a signal to be displayed, a pipe connection leading from said tank to said signal, and manually operative means interposed in said connection normally closing the same and adapted when operated to open the same and thereby permit the pressure of the exhaust action from the tank to effect the display of the signal, the means interposed in said pipe connection comprising a cylinder, and a piston therein having a groove to connect the branches of the pipe when moved so to do, an exposed head bearing an indication of the signal to be displayed and means for venting that branch of the pipe connected with the signal when the signal is to be cut off from the exhaust action and be concealed.

5. Signalling apparatus comprising a signal to be displayed, a vacuum tank of adequate size in which a constant vacuum may be maintained, a pipe connecting said tank with the intake manifold of a motor vehicle and having an automatic check valve between said tank and the motor, a pipe connection leading from the tank to the signal and normally closed therefrom, means for applying the pressure of the exhaust from the tank on the signal for effecting the display of the same, and means for relieving the exhaust action from the signal so that it may become concealed.

6. Signalling apparatus comprising a vacuum tank of adequate size in which a constant vacuum may be maintained, a pipe connecting said tank with the intake manifold of a motor vehicle and having an automatic check valve between said tank and the motor, a cylinder having a piston carrying a signal to be displayed, a pipe connection leading from said tank to said cylinder at the upper side of the piston, and means interposed in said pipe connection normally closing the same and adapted for manual operation to open said pipe connection and permit the pressure of the exhaust from said tank to act against said piston to move the signal to display position.

7. Signalling apparatus comprising a vacuum tank of adequate size in which a constant vacuum may be maintained, a pipe connecting said tank with the intake manifold of a motor vehicle and having an automatic check valve between said tank and the motor, a cylinder having a piston carrying a signal to be displayed, a pipe connection leading from said tank to said cylinder at the upper side of the piston, and means interposed in said pipe connection normally closing the same and adapted for manual operation to open said pipe connection and permit the pressure of the exhaust from said tank to act against said piston to move the signal to display position, said interposed means also having means for venting that branch of the pipe connection leading to said cylinder when the signal is to be concealed.

8. Signalling apparatus comprising a plurality of signals, a vacuum tank of adequate size in which a constant vacuum may be maintained, a pipe connecting said tank with the intake manifold of the motor vehicle and having an automatic check valve between said tank and the motor, and means for applying the pressure of the exhaust from the tank on any of said signals for thereby effecting the display of the same.

9. Signalling apparatus comprising a plurality of signals, a vacuum tank of adequate size in which a constant vacuum may be maintained, a pipe connecting said tank with the intake manifold of the motor vehcle and having an automatic check valve between said tank and the motor, a series of independent pipe connections leading from said tank to the respective signals and normally closed therefrom, means for applying the pressure of the exhaust from the tank on any of said signals for thereby effecting the display of the same, and means for relieving the exhaust action from any displayed signal so that it may become concealed.

10. Signalling apparatus comprising a vacuum tank of adequate size in which a constant vacuum may be maintained, a pipe connecting said tank with the intake manifold of the motor vehicle and having an automatic check valve between said tank and the motor, a plurality of cylinders having pistons carrying signals to be displayed, independent pipe connections leading from said tank to said cylinders for applying the pressure of the exhaust from the tank on any of said signals for thereby effecting the display of the same, and means interposed in said pipes for opening any of the same to said cylinders and bearing indications of the several signals to guide the operator in actuating the same.

11. Signalling apparatus comprising a vacuum tank of adequate size in which a constant vacuum may be maintained, a pipe connecting said tank with the intake manifold of the motor vehicle and having an automatic check valve between said tank and the motor, a plurality of cylinders having pistons carrying signals to be displayed, independent pipe connections leading from said tank to said cylinders for applying the pressure of the exhaust from the tank on any of said signals for thereby effecting the display of the same, means interposed in said pipes for opening any of the same to said cylinders and bearing indications of the several signals to guide the operator in actuating the same, and means for restoring all of said interposed means simultaneously to their normal position closing said pipe connections.

12. Signalling apparatus comprising a vacuum tank of adequate size in which a constant vacuum may be maintained, a pipe connecting said tank with the intake manifold of the motor vehicle and having an automatic check valve between said tank and the motor, a plurality of signals to be displayed, independent pipe connections leading from said tank to said cylinders, and means interposed in said pipes normally closing the same and adapted for independent operation for opening any of said pipes for thereby applying the pressure of the exhaust from the tank on any of said signals for effecting the display of the same, said interposed means comprising a key-board having cylinders into and from which said pipe connections lead, pistons in said cylinders for opening or closing said pipes and exposed heads on said pistons bearing indications of the signals to be displayed as a guide to the operator in actuating said pistons.

Signed at Wheeling, in the county of Ohio and State of West Virginia, this 31st day of October, A. D. 1918.

ALFRED INGRAM.
HARRY INGRAM.

Witnesses:
ROBERT C. EUWER,
WM. H. TRACY.